United States Patent
Shirasaka et al.

(10) Patent No.: US 7,509,857 B2
(45) Date of Patent: Mar. 31, 2009

(54) INERTIAL MEASUREMENT SYSTEM AND METHOD WITH SENSOR BIAS CANCELLATION

(75) Inventors: Ichiro Shirasaka, Danville, CA (US); Randall Jaffe, Clayton, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 84 days.

(21) Appl. No.: 11/726,389

(22) Filed: Mar. 20, 2007

(65) Prior Publication Data

US 2007/0245800 A1 Oct. 25, 2007

Related U.S. Application Data (63) Continuation-in-part of application No. 11/072,064, filed on Mar. 4, 2005, now Pat. No. 7,191,636.

(51) Int. Cl.
*G01C 19/00* (2006.01)
*C01C 25/00* (2006.01)
(52) U.S. Cl. ..................... 73/504.03; 73/1.77
(58) Field of Classification Search .............. 73/504.02, 73/504.04, 504.13, 504.14, 504.15, 504.16, 73/1.37, 1.38
See application file for complete search history.

(56) References Cited

U.S. PATENT DOCUMENTS

| | | | |
|---|---|---|---|
| 2,995,934 A | 8/1961 | Harvey | |
| 3,619,906 A | 11/1971 | Yates | |
| 3,736,791 A | 6/1973 | Cantwell | |
| 3,757,093 A | 9/1973 | Licata | |
| 4,399,694 A | 8/1983 | Mayer | |
| 4,799,385 A * | 1/1989 | Hulsing et al. | 73/504.12 |
| 5,194,872 A | 3/1993 | Musoff | |
| 5,438,410 A | 8/1995 | Killpatrick | |
| 6,497,146 B1 * | 12/2002 | Hobbs et al. | 73/504.12 |
| 6,701,786 B2 * | 3/2004 | Hulsing, II | 73/514.02 |
| 2002/0174720 A1 | 11/2002 | Cardarelli | |

OTHER PUBLICATIONS

Neal, S.R., et al., "Self-Alignment of a Gimballess Inertial Navigation System", NWC Technical Publication 4463, Mar. 1968, Naval Weapons Center, China Lake, California.

* cited by examiner

*Primary Examiner*—Helen C. Kwok
(74) *Attorney, Agent, or Firm*—Edward S. Wright (57) ABSTRACT

Inertial measurement system and method in which a gyroscope is periodically dithered about an axis perpendicular to its input axis, a signal from the gyroscope is delayed to provide a delayed signal which lags the gyroscope signal by one-half of the dithering period, and the delayed signal and the signal from the gyroscope are combined to provide an output signal from which the bias has been cancelled.

24 Claims, 6 Drawing Sheets

INERTIAL MEASUREMENT SYSTEM AND METHOD WITH SENSOR BIAS CANCELLATION

CROSS-REFERENCE TO RELATED APPLICATIONS

Continuation-in-Part of Ser. No. 11/072,064, filed Mar. 4, 2005 now U.S. Pat. No. 7,191,636.

BACKGROUND OF THE INVENTION

1. Field of Invention

This invention pertains generally to inertial measurement, and, more particularly, to an inertial measurement system and method in which the fixed bias offset of rate sensors or gyroscopes is cancelled.

2. Related Art

Angular rate sensors or gyroscopes (gyros) exhibit a non-zero output in the absence of rotation about the input axis. This non-zero output is called bias, and it can cause significant errors in inertial measurements. The magnitude of the error depends upon the type of sensor or gyroscope used. In applications with stringent limits on offset errors, more expensive sensors with very low residual offset errors must generally be used, and those sensors are often relatively large and heavy.

Heretofore, offset errors have been eliminated by the application of a constant rotation. For example, horizontal inertial instruments such as gyroscopes and accelerometers have been rotated continuously in carousel fashion about a vertical axis. However, it is not always feasible or even desirable to apply a constant rotation.

With ring laser gyros, errors caused by a well known frequency lock-in effect are minimized by dithering the sensors about the input axis. However, rotating a sensor about its input axis is undesirable because it provides an angular rate input other than the one to be detected.

In inertial systems of the prior art it is also necessary to rely on complex models to predict variation in offsets over time and due to factors such as temperature. These models can be quite useful in some applications, but it is often necessary to cancel offsets to a higher level of precision than the models can provide.

OBJECTS AND SUMMARY OF THE INVENTION

It is in general an object of the invention to provide a new and improved system and method for inertial measurement in which fixed bias offset is cancelled.

Another object of the invention is to provide a system and method of the above character which overcome the limitations and disadvantages of the prior art.

These and other objects are achieved in accordance with the invention by providing an inertial measurement system and method in which a gyroscope is periodically dithered about an axis perpendicular to its input axis, a signal from the gyroscope is delayed to provide a delayed signal which lags the gyroscope signal by one-half of the dithering period, and the delayed signal and the signal from the gyroscope are combined to provide an output signal from which the bias has been cancelled.

DETAILED DESCRIPTION

Figure 1:
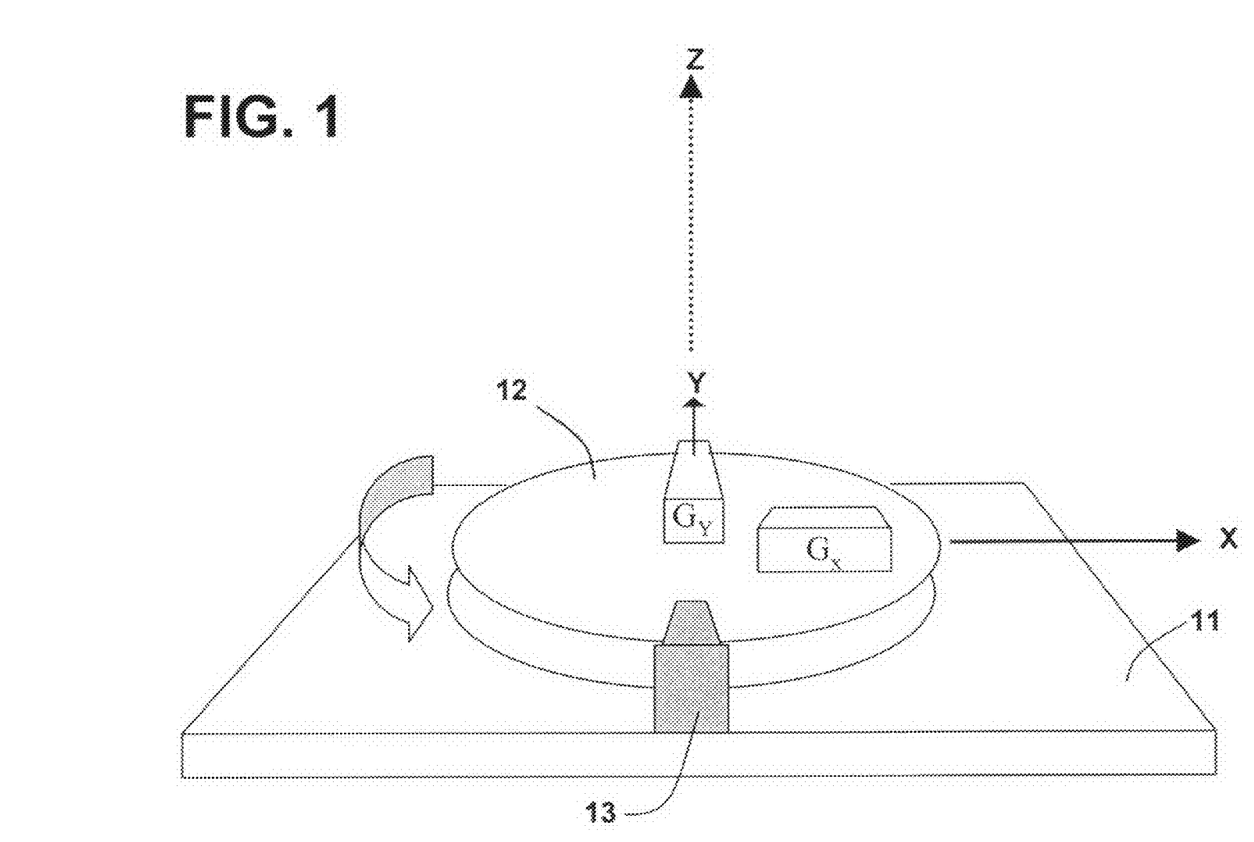
FIG. 1 is a schematic perspective view of one embodiment of a rate sensor system according to the invention.

As illustrated in FIG. 1, the system includes a mounting base 11 and two angular rate sensors or gyroscopes $G_x$ and $G_y$, which are mounted on a modulator 12 on the base, with the input axes of the sensors nominally aligned with the x and y axes of the base. The modulator rotates the sensors about the z-axis which is perpendicular to input axes of the sensors and to the base. The rotation is oscillatory or dithering in nature, with a frequency on the order of a few Hertz to several hundred Hertz and an amplitude on the order of several milliradians to tens of degrees. A sensor 13 monitors the position of the modulator and provides a signal corresponding to the instantaneous angular displacement of the modulator and the rate sensors. As discussed more fully hereinafter, that signal allows the system to demodulate or remove the effect of the modulation in connection with the processing of the gyro output signals.

The modulator can be of suitable known design, including oscillating mechanical flexures or springs, galvanometers, voice-coil actuators, piezoelectric actuators, motors, or micro-electromechanical (MEMS) based structures. The amplitude of the modulation should be large enough to provide adequate resolution of the gyro output signals, and the frequency should be higher than the rotation to be measured. In addition, the modulator must provide stable motion in the plane of the sensor axes. The motion can be of any suitable type, including a simple periodic waveform such as a sine wave or a square wave, or a more complex motion.

Modulation sensor 13 can also be of conventional design such as a coil and magnet, an optical sensor, or an encoder.

The rotation of the modulator causes the input axes of the rate sensors or gyros to rotate with respect to the fixed axes of the base, and the difference in alignment between sensor axes and the axes of the base at any given time is equal to the instantaneous angular position of the modulator. Unlike prior art devices which rotate the sensor about the input axis and thereby apply an angular rate input to the sensor, the modulator rotates the input axes themselves, and there is no spurious rate input. The orientation of the input axes is varied in a dithering manner with a relatively rapid, oscillatory motion, and in the absence of other externally applied angular inputs, the rotation of the sensor axes does not produce a rotation rate signal.

Figure 2:
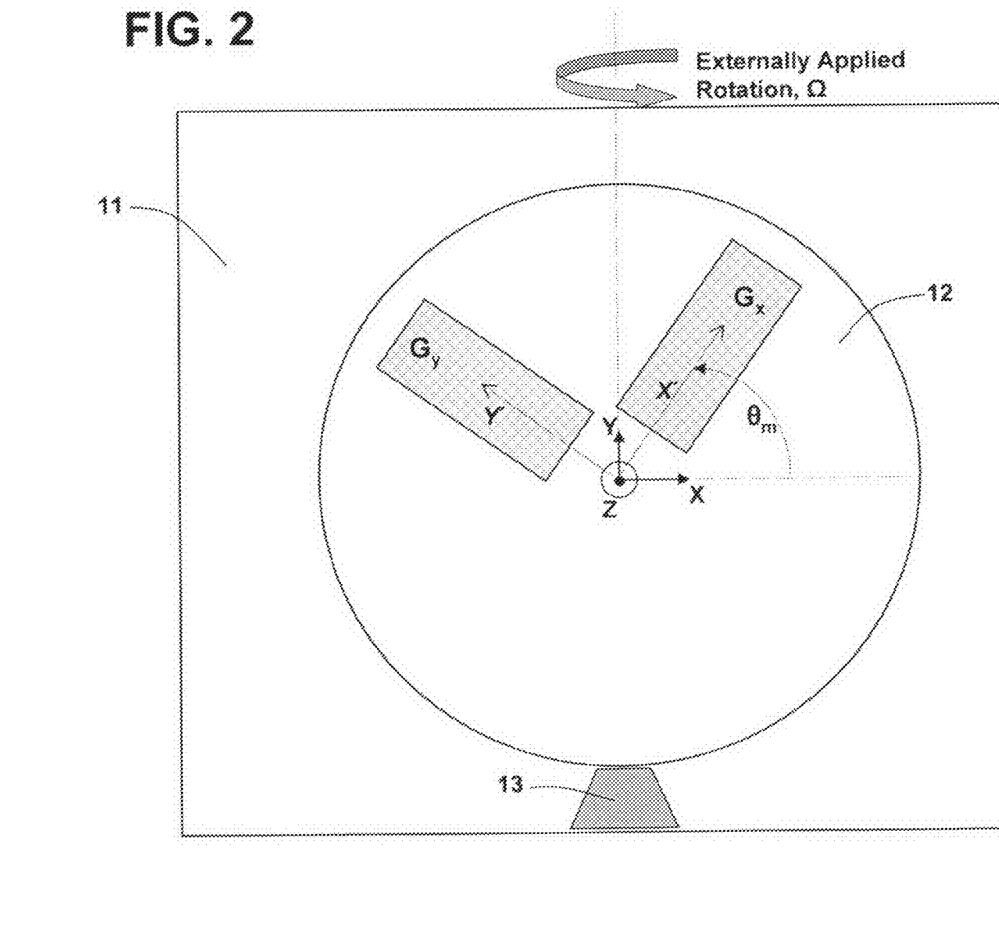
FIG. 2 is a top plan view of the embodiment of FIG. 1.

In FIG. 2, the input axes x', y' of the rate sensors or gyros are shown as being rotated by an angle $\theta_m$ with respect to the fixed reference axes x, y of the base. The z-axis is perpendicular to the plane of the figure, and an external rate of $\Omega$ rotation $\Omega$ is applied to the entire system, including the base, about the y-axis.

For high bandwidth applications, the modulator oscillates about the z-axis with an amplitude which is typically on the order of 2-50 milliradians and a frequency on the order of 20-500 Hz, with higher frequencies of oscillation typically being associated with smaller amplitudes of oscillation. For low bandwidth applications, such as gyrocompassing, a slower modulation with greater amplitude of oscillation is used, e.g., an amplitude of 10 degrees or more at a frequency less than 1 Hertz. Sensor 13 detects the instantaneous value of $\theta_m$ and provides a signal which is used in processing the output signals from the gyros. That signal allows the system to compensate for the time-varying input axes of rate sensors $G_x$ and $G_y$ as well as being used in demodulating the gyro outputs.

The rate sensors or gyros should have a suitable bandwidth for measurements at the frequency of the input axis modulation, and they should also have low enough noise in the frequency range near the modulation frequency to permit the gyro modulation signals to be adequately resolved.

Prior to demodulation, the output of each rate sensor or gyro consists of a combination of the sensor fixed offset and the externally applied angular rate. Since the modulation affects the applied angular rate, but not the fixed offset, the system is able to distinguish between them.

With the two signals being affected differently by the modulation of the input axis, relatively simple signal processing can be used to separate the two signals, producing a gyro output that is substantially free from the typical effects of gyro offset error or bias. The signal from the modulation sensor which corresponds to the instantaneous orientation of the axes is used in conjunction with an input axis demodulator in the processing circuit to remove the effect of the mechanical modulation.

The time-varying modulation angle θm can be written as the sum of a constant angle $\theta_0$ and a modulation amplitude m which varies, e.g. sinusoidally, in time t at an angular frequency ω. Thus, $\theta_m = \theta_0 + m \sin(\omega t)$. The output signal $S_x$ of gyro $G_x$ due to externally applied rotation Ω is given by:

$$S_x = \Omega \sin(\theta_m) = \Omega \sin[\theta_0 + m \sin(\omega t)].$$

Using the trigonometric identity for the sine of a sum of angles, keeping second-order and lower terms of m and adding a bias offset $B_x$, the relationship becomes:

$$S_x = \Omega [\sin(\theta_0)(1-(1/2)m^2 \sin^2(\omega t)) + \cos(\theta_0) m \sin(\omega t)] + B_x.$$

The fixed offset $B_x$ is not modulated, and if a synchronous demodulation is performed on $S_x$ at frequency f=ω/2π, only a term proportional to Ω m cos($\theta_0$) remains. Since the value of m is known from the modulator pickoff signal, the value of Ω cos($\theta_0$), which is the component of the externally applied rotation along the input axis of gyro $G_x$ is determined. If the magnitude of the. externally applied rotation Ω is also known, the orientation angle $\theta_0$ is also determined. The fixed bias offset $B_x$ is washed out or cancelled in regard to these calculations, both for the component of rotation along the x-axis and the angle of orientation relative to the applied rotation.

A similar analysis applies to gyro $G_y$ and output signal $S_y$. The component of externally applied rotation is also computed for $G_y$, and if the value of this applied rotation is known, the orientation angle of $G_y$ relative to the input rotation can be determined. The fixed bias $B_y$ of gyro $G_y$ is also cancelled by this method in the same manner as the fixed bias for gyro $G_x$.

With the demodulated outputs from the two gyros, the values of both the applied rotation Ω and the orientation angle $\theta_0$ can be determined. If the demodulated output signals of the two gyros are designated $S_{xd}$ and $S_{yd}$, then since $S_{xd} \propto \Omega \cos(\theta_0)$, and $$S_{yd} \propto \Omega \sin(\theta_0),$$

$$S_{xd}^2 + S_{yd}^2 \propto \Omega^2, \text{ and}$$

$$S_{yd}/S_{xd} \propto \tan(\theta_0).$$

Although in FIG. 2 the external rotation is shown as being applied about the y-axis, this method is valid for any applied rotation about an axis in the plane of the modulator or for the in-plane component of rotation about an axis outside the plane. The angle $\theta_0$ is then interpreted as the angle from the axis of the applied rotation to the input axis of gyro $G_y$, or as the complement of the angle from the rotation axis to the input axis of gyro $G_x$.

Figure 3:
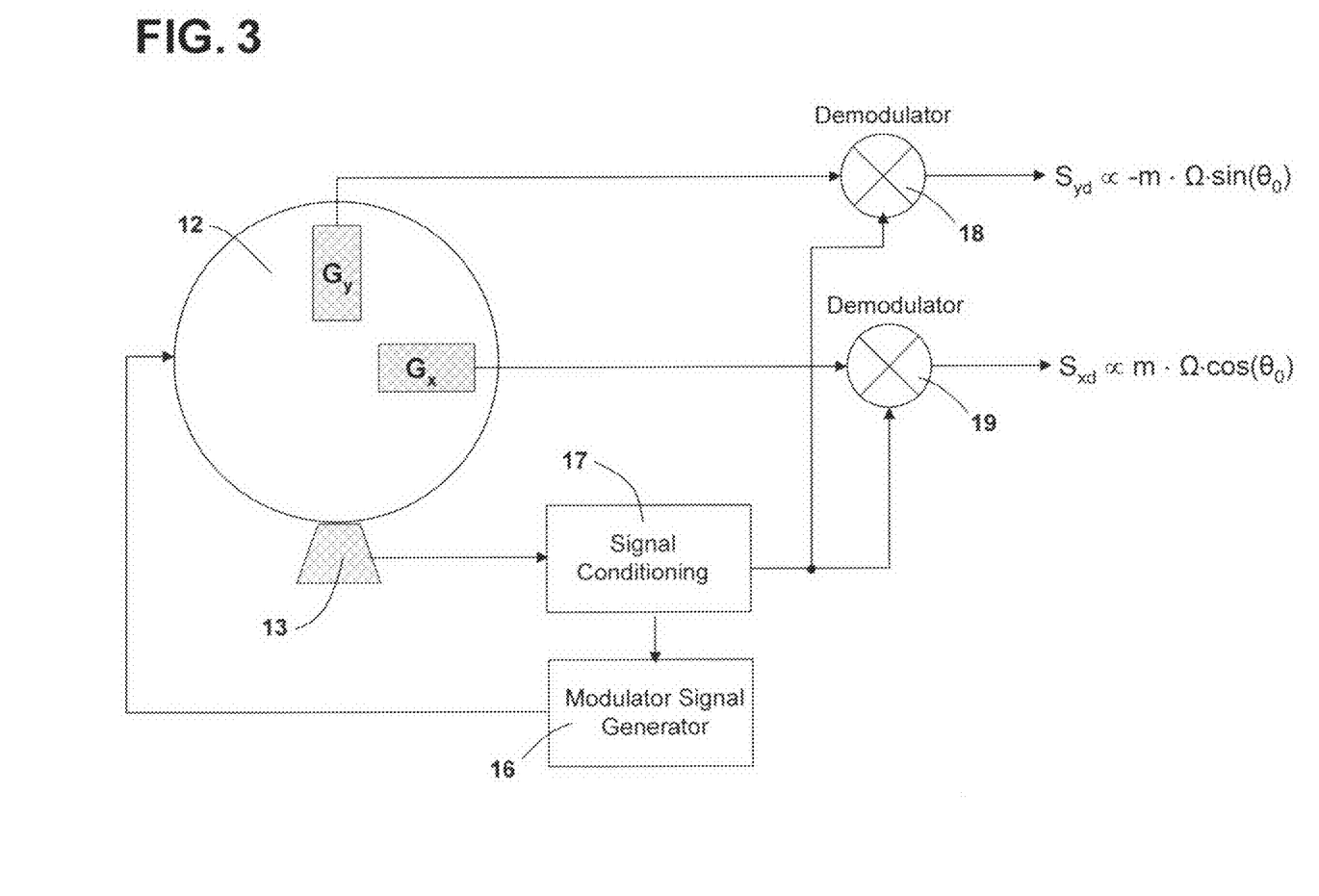
FIG. 3 is a block diagram of the embodiment of FIG. 1 with means for processing signals from the sensors in accordance with the invention.

As shown in FIG. 3, modulator 12 is driven by a signal generator 16 which includes an automatic gain control (AGC) circuit. The output of modulation sensor 13 is processed in a conditioning circuit 17, and the conditioning circuit provides a feedback signal to the AGC circuit in the signal generator to maintain the amplitude of the modulation at a constant level. As in FIG. 2, the externally applied rotation Ω is about an axis in the plane of the input axes of the two gyros.

The outputs of the two gyros are applied to the inputs of a pair of demodulators 18, 19, and the output of signal conditioning circuit 17 is applied as a phase reference to the two demodulators. The outputs of the demodulators are the signals $S_{xd}$ and $S_{yd}$ from which the values of applied rotation Ω and the angle of orientation $\theta_0$ are determined.

Output signals $S_x$ and $S_y$ can be fed to analog signal processing circuitry (not shown) to provide an analog output signal corresponding to the applied external rotation Ω, or they can be converted to digital form and processed digitally for filtering, compensation of errors, and output. Alternatively, the gyros and the signal conditioning circuit can provide digital outputs, and demodulators 18, 19 can be digital as well.

Figure 4:
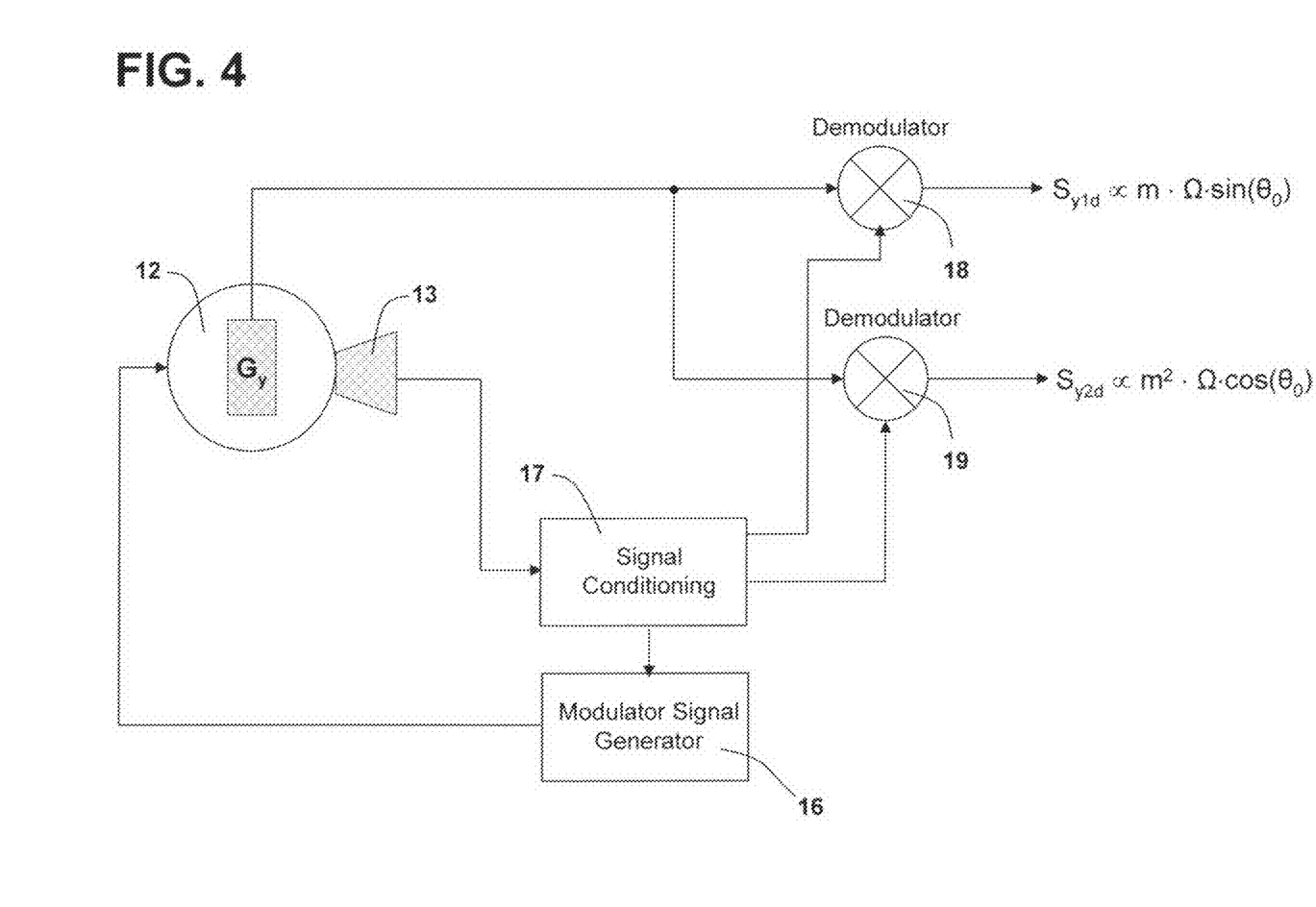
FIG. 4 is a block diagram of another embodiment of a rate sensor system incorporating the invention.

The embodiment of FIG. 4 is similar to the embodiment of FIG. 3 except that only a single gyro $G_y$ is used, and signal processing circuit 17 provides two frequency reference outputs. One of those outputs has a frequency of ω/2π and is equivalent to the reference signal applied to the demodulators in the embodiment of FIG. 3. It is applied to the reference input of demodulator 18. The other reference output has frequency of ω/π and is applied to the reference input of demodulator 19. The output of gyro $G_y$ is applied to the signal inputs of both demodulators.

Demodulator 18 operates in the same manner as in the embodiment of FIG. 3, providing an output signal $S_{y1d}$ which is proportional to m Ω sin($\theta_0$), which is linearly proportional to the amplitude m of the modulation. Demodulator 19 operates at twice the frequency of the modulator and converts the output of gyro $G_y$ to a signal $S_{y2d}$ which is proportional to $m^2$ Ω cos($\theta_0$), i.e. the second order in the modulation amplitude m. The signals from the two demodulators can be used in combination to determine the values of applied rotation Ω and the angle of orientation $\theta_0$ since m is controlled by signal generator 16 and is therefore known.

If desired, the embodiment of FIG. 4 can be extended to a plurality of gyros by mounting the gyros on separate modulators and processing the output of each gyro with a processing circuit as in FIG. 4.

Figure 5:
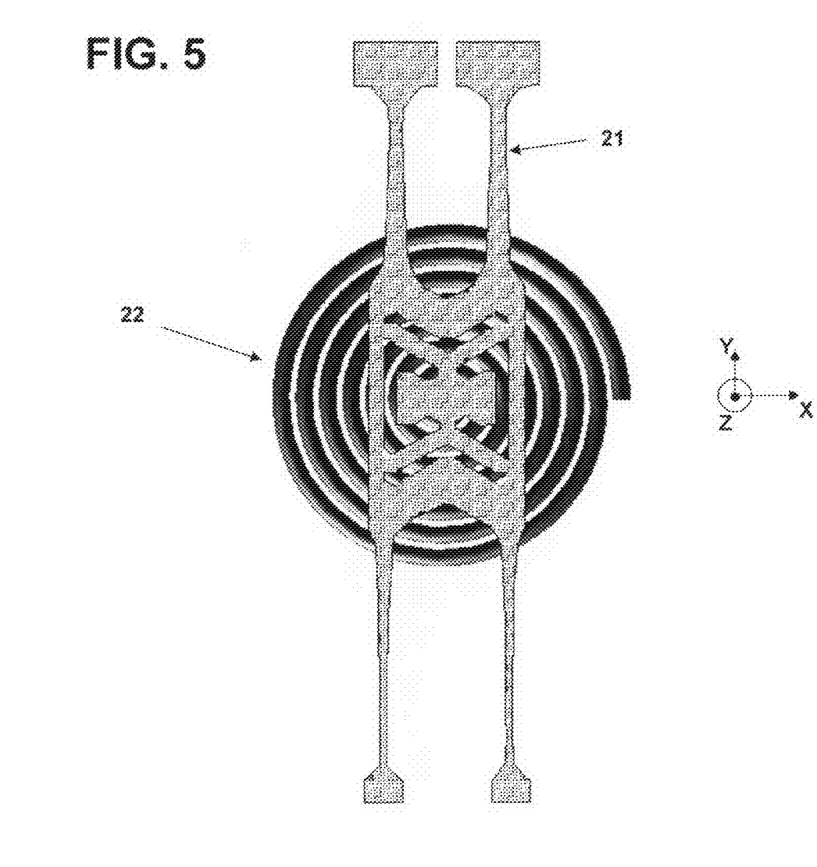
FIG. 5 is a top plan view, somewhat schematic, of another embodiment of a rate sensor system incorporating the invention.

It is also possible to incorporate a modulator into the design of the gyro itself by mounting the rate sensing element onto a mechanical flexure or the like. The gyro and the flexure are then packaged within the outline of the gyro. Thus, in the embodiment of FIG. 5, a rate sensor in the form of a quartz tuning fork 21 is mounted on a modulator in the form of a coil spring 22, with the sensitive axis of the tuning fork parallel to the y-axis and the modulator oscillating about an axis parallel to the z-axis.

The modulator can also be made an integral part of the sensor structure, which is particularly suitable for very small gyro sensing elements such as those produced from quartz or silicon wafers using micro-electromechanical (MEMS) techniques. Such devices would thus be made suitable for applications where higher accuracy is required without significant cost or increase in size.

The invention is particularly suitable for use in gyrocompassing applications where the angular velocity of the earth is used to determine north. In such applications, the externally applied rotation is just the rotation of the earth, and determination of the angle $\theta_0$ allows the system to find north. If the system is locally level, or if the inclination of the system is known by the use of accelerometers, the latitude can also be determined from the component of the earth's rate as measured by the gyros in the horizontal plane of the locally level system. Adjustment for the effect of the modulation amplitude can be made in the calibration of the system. The invention is also useful in other inertial applications such as dynamic navigation.

Although the modulator has been described and illustrated as being a planar structure which rotates about an axis perpendicular to its plane, it can also be implemented in other ways as long as it produces a rotation of one or more sensor input axes that results in an oscillation of the orientation of those axes.

In the embodiments disclosed thus far, the gyro fixed bias cancellation is enabled by the modulation, which modulates the signal to be measured as opposed to the bias, but the actual cancellation is performed by the demodulation process. It is also possible to cancel the fixed bias in the time-varying (ac) signal prior to rectification, or demodulation. As discussed more fully hereinafter, this is done by subtracting a time-delayed (one-half of the dither modulation period) gyro output from the current gyro output to cancel the bias at the ac level prior to demodulation. This technique is particularly applicable where static angular rates are to be measured, such as earth rate measurements during gyrocompassing, or where the dither frequency is much higher than the system bandwidth requirement.

Figure 6:
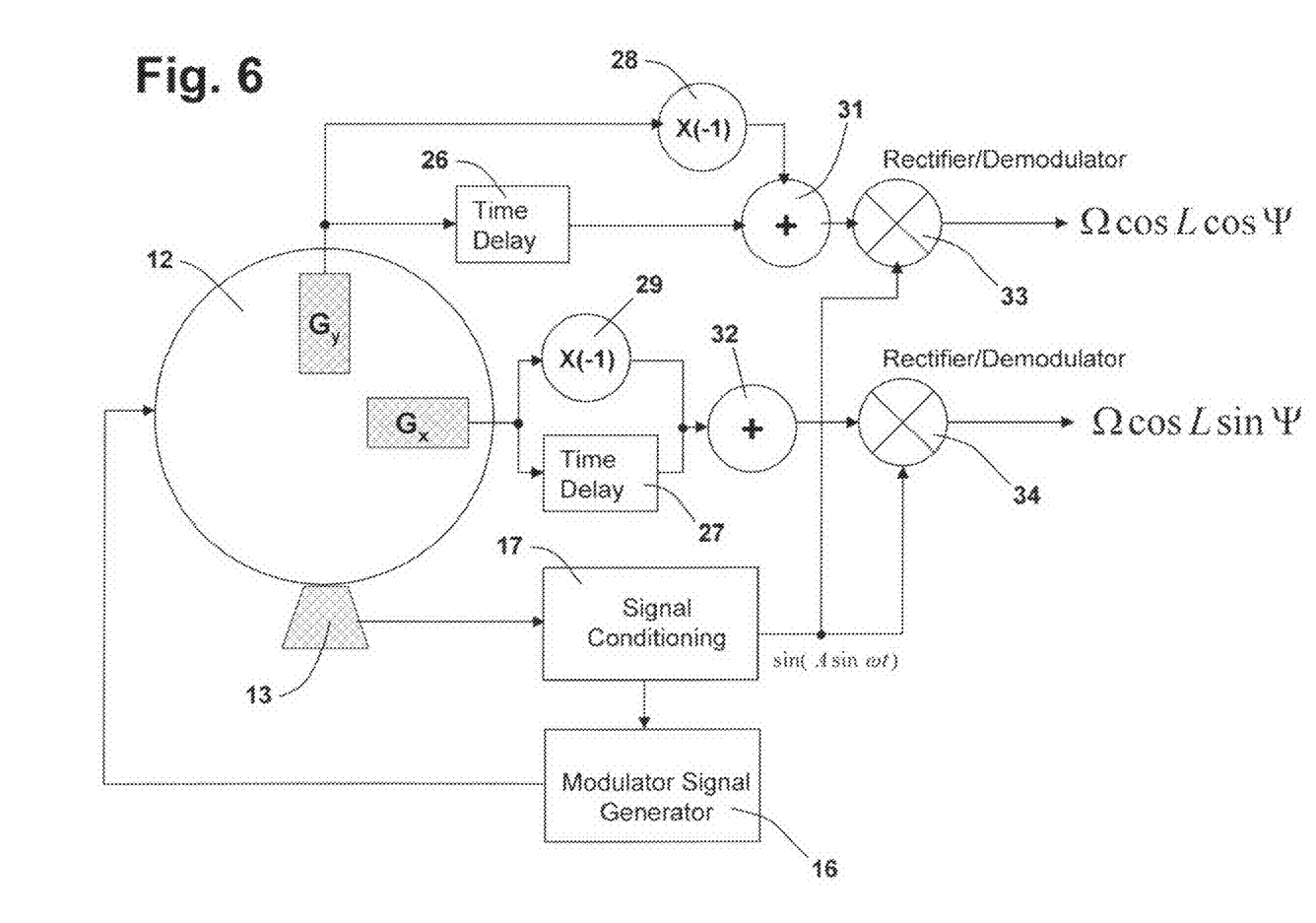
FIG. 6 is a block diagram of another embodiment of a rate sensor system incorporating the invention.

FIG. 6 illustrates a leveled two-axis angular rate measurement unit with two low-noise gyroscopes. Each gyro may output a certain amount of constant bias but relatively low angular noise ($\leq 10^{-3} \deg/\sqrt{hr}$).

The two-axis rate measurement unit is modulated or dithered with respect to its local vertical (down) axis with the amplitude of A radians and at the frequency of f Hertz. The only angular rate input to the system is Earth's rate.

Then angular rates measured by x and y gyros are given by $$\begin{cases} \omega_x = \Omega \cos L \cos(\Psi + A \sin \omega t) + B_x + v_x \\ \omega_y = -\Omega \cos L \sin(\Psi + A \sin \omega t) + B_y + v_y \end{cases} \quad (1)$$

where $\Omega$=earth rate,
L=latitude,
$\omega=2\pi f$ $B_i$=i–gyro constant bias, (i=x or y)
$v_i$=i–gyro zero-mean noise, (i=x or y)

and the local level reference frame is assumed to be North, East, Down.

The time averages of terms in equations (1) are:

$$\begin{cases} \bar{\omega}_x = \frac{1}{T} \int_0^T \omega_x dt \\ \bar{\omega}_y = \frac{1}{T} \int_0^T \omega_y dt \end{cases}$$

Assuming that the zero-mean gyro noise becomes negligible over the averaging-time T, we have $$\begin{cases} \bar{\omega}_x = \Omega \cos L \cos(\Psi + A \sin \omega t) + B_x \\ \bar{\omega}_y = -\Omega \cos L \sin(\Psi + A \sin \omega t) + B_y \end{cases} \quad (2)$$

Then, define $$\begin{cases} \bar{\omega}_x^-(\omega t) \equiv \Omega \cos L \cos(\Psi - A \sin \omega t) + B_x \\ \bar{\omega}_y^-(\omega t) \equiv -\Omega \cos L \sin(\Psi - A \sin \omega t) + B_y \end{cases} \quad (3)$$

And $$\begin{cases} \bar{\omega}_x^+(\omega t) \equiv \Omega \cos L \cos(\Psi + A \sin \omega t) + B_x \\ \bar{\omega}_y^+(\omega t) \equiv -\Omega \cos L \sin(\Psi + A \sin \omega t) + B_y \end{cases} \quad (4)$$

From equations (3) and (4) if follows that $$\begin{cases} \bar{\omega}_x^-(\omega t) = \bar{\omega}_x^+(\omega t + \pi), \\ \bar{\omega}_y^-(\omega t) = \bar{\omega}_y^+(\omega t + \pi). \end{cases} \quad (5)$$

Thus, the negative of the sine terms in equations (3) and (4) is equivalent to a phase shift of pi radians (180 degrees) in the sine terms. We can then define difference rate terms for x and y gyros as follows:

$$\begin{cases} \Delta\bar{\omega}_x^+(\omega t) \equiv \bar{\omega}_x^-(\omega t) - \bar{\omega}_x^+(\omega t) = \bar{\omega}_x^+(\omega t + \pi) - \bar{\omega}_x^+(\omega t), \\ \Delta\bar{\omega}_y^+(\omega t) \equiv \bar{\omega}_y^-(\omega t) - \bar{\omega}_y^+(\omega t) = \bar{\omega}_y^+(\omega t + \pi) - \bar{\omega}_y^+(\omega t). \end{cases} \quad (6)$$

where the time-delayed signal (delay=one-half modulation period) is substituted for $\bar{\omega}_x^-$ and $\bar{\omega}_y^-$.

As described in equations (6), the fixed bias is removed from the ac signals prior to demodulation, providing bias-free differential terms $\Delta\bar{\omega}_x^+(\omega t)$ and $\Delta\bar{\omega}_y^+(\omega t)$. This operation of bias cancellation is performed in a self-interferential manner, i.e. by taking a difference between its i-phase shift (delay) value and the current value.

The signal of interest is inverted in sign by the inclusion of the pi-radian phase shift whereas the fixed bias is (by definition) constant. Therefore, by taking the difference of the delayed signal and the current signal, one obtains twice the signal of interest and the fixed bias cancels since it is unaffected by the dither. This method is best suited for applications where the signal to be measured is constant (as with Earth rate) or varies slowly in comparison to one-half period of the dither.

From equations (3)-(6) if follows that:

$$\begin{cases} \Delta\overline{\omega}_x^+(\omega t) = 2\Omega\cos L\sin\Psi\sin(A\sin\omega t), \\ \Delta\overline{\omega}_y^+(\omega t) = 2\Omega\cos L\cos\Psi\sin(A\sin\omega t). \end{cases} \quad (7)$$

This can be rectified by multiplying by sin(A sin ωt), obtaining:

$$\begin{cases} \Delta\overline{\omega}_x^+(\omega t)\sin(A\sin\omega t) = 2\Omega\cos L\sin\Psi\sin^2(A\sin\omega t), \\ \Delta\overline{\omega}_y^+(\omega t)\sin(A\sin\omega t) = 2\Omega\cos L\cos\Psi\sin^2(A\sin\omega t). \end{cases} \quad (8)$$

So that $$\begin{cases} \Delta\overline{\omega}_x^+(\omega t)\sin(A\sin\omega t) = 2\Omega\cos L\sin\Psi(1 - \cos^2(A\sin\omega t)), \\ \Delta\overline{\omega}_y^+(\omega t)\sin(A\sin\omega t) = 2\Omega\cos L\cos\Psi(1 - \cos^2(A\sin\omega t)). \end{cases} \quad (9)$$

Taking a DC component (e.g., mean) for equations (9), we get $$\begin{cases} \{\Delta\overline{\omega}_x^+(\omega t)\sin(A\sin\omega t)\}_{DC} = \Omega\cos L\sin\Psi, \\ \{\Delta\overline{\omega}_y^+(\omega t)\sin(A\sin\omega t)\}_{DC} = \Omega\cos L\cos\Psi. \end{cases} \quad (10)$$

Taking the ratio, $$\frac{\{\Delta\overline{\omega}_x^+(\omega t)\sin(A\sin\omega t)\}_{DC}}{\{\Delta\overline{\omega}_y^+(\omega t)\sin(A\sin\omega t)\}_{DC}} = \frac{\sin\Psi}{\cos\Psi} = \tan\Psi \quad (11)$$

we obtain $$\Psi = \tan^{-1}\frac{\{\Delta\overline{\omega}_x^+(\omega t)\sin(A\sin\omega t)\}_{DC}}{\{\Delta\overline{\omega}_y^+(\omega t)\sin(A\sin\omega t)\}_{DC}}. \quad (12)$$

which is the heading angle with respect to the component of angular rotation in the plane of the two gyros (plane of the dither modulation). From equations (2) and (12), the constant gyro biases can be calculated, and thus calibrated, as follows:

$$\begin{cases} B_x = \{\overline{\omega}_x\}_{DC} - \Omega\cos L\cos\left[\tan^{-1}\frac{\{\Delta\overline{\omega}_x^+(\omega t)\sin(A\sin\omega t)\}_{DC}}{\{\Delta\overline{\omega}_y^+(\omega t)\sin(A\sin\omega t)\}_{DC}}\right], \\ B_y = \{\overline{\omega}_y\}_{DC} + \Omega\cos L\sin\left[\tan^{-1}\frac{\{\Delta\overline{\omega}_x^+(\omega t)\sin(A\sin\omega t)\}_{DC}}{\{\Delta\overline{\omega}_y^+(\omega t)\sin(A\sin\omega t)\}_{DC}}\right]. \end{cases} \quad (13)$$

In the foregoing, the signal used to rectify (demodulate) the signals is the sine of the actual modulation angle in time: sin (A sin ωt). This is distinct from using either a simple first- or second-harmonic demodulation as described with reference to the embodiments of FIGS. 3-4. Rather, this refinement of the rectification process comprises all orders simultaneously.

This can be seen in the embodiment of FIG. 6 which has the same arrangement of gyros $G_x$, $G_y$ and modulator 16 as in the embodiment of FIG. 3. In this embodiment, however, the signals from the two gyros are passed through time delay circuits 26, 27 which delay the signals by one-half of the modulation period. The signals from the modulators are also applied to inverters 28, 29, and the output signals from the delay circuits and the inverters are applied to the inputs of summation circuits 31, 32. The outputs of the summation circuits are applied to the inputs of rectifier/demodulators 33, 34, and signal conditioning circuit 17 provides a rectification signal sin (A sin ωt) to each of the two demodulators. Demodulator 33 multiplies the summation signal for gyro $G_y$, and sin (A sin ωt), and demodulator 34 multiplies the summation signal for gyro $G_x$, and sin (A sin ωt). The time-averaged outputs of the demodulators provide the desired components of earth rate in the level plane, as required for gyrocompassing.

If desired, the gyros in the embodiment of FIG. 6 can be placed on separate modulators to provide individual gyros that can be oriented as desired to obtain a full 3 degree-of-freedom rate sensing system.

The invention has a number of important features and advantages. By eliminating the effects of bias offset, it makes it possible to use less expensive rate sensors or gyros which are relatively small in size but would otherwise be precluded from use because of their relatively large bias offsets. The smaller sensors lend themselves to use with smaller modulators, which provides a compact and relatively inexpensive system with improved accuracy. Fixed bias offsets are eliminated or cancelled without producing a spurious rotation rate signal, and the system can also provide cancellation of residual errors in offset compensation models.

It is apparent from the foregoing that a new and improved inertial measurement system and method have been provided. While only certain presently preferred embodiments have been described in detail, as will be apparent to those familiar with the art, certain changes and modifications can be made without departing from the scope of the invention as defined by the following claims.

The invention claimed is:

1. A system for cancelling the bias of a gyroscope which provides a signal corresponding to rate of rotation about an input axis, comprising: means for periodically dithering the gyroscope about an axis perpendicular to the input axis, means for delaying the gyroscope signal to provide a delayed signal which lags the gyroscope signal by one-half of the dithering period, and means for combining the delayed signal with the signal from the gyroscope to provide an output signal from which the bias has been cancelled.

2. The system of claim 1 wherein the means for combining the delayed signal with the signal from the gyroscope includes means for subtracting one of the signals from the other.

3. The system of claim 1 wherein the means for combining the signals comprises means for inverting the gyroscope signal and means for adding the delayed signal and the inverted signal together to provide the output signal.

4. The system of claim 1 including means for demodulating the output signal.

5. The system of claim 1 wherein the means for periodically dithering the gyroscope includes means for dithering the gyroscope at a frequency substantially higher than the rate of rotation.

6. A method of cancelling the bias of a gyroscope which provides a signal corresponding to rate of rotation about an input axis, comprising the steps of: periodically dithering the gyroscope about an axis perpendicular to the input axis, delaying the gyroscope signal to provide a delayed signal which lags the gyroscope signal by one-half of the dithering period, and combining the delayed signal with the signal from the gyroscope to provide an output signal from which the bias has been cancelled.

7. The method of claim 6 wherein the delayed signal and the signal from the gyroscope are combined by subtracting one of the signals from the other.

8. The method of claim 6 wherein the signals are combined by inverting the gyroscope signal and adding the delayed signal and the inverted signal together to provide the output signal.

9. The method of claim 6 including the step of demodulating the output signal.

10. The method of claim 6 wherein the gyroscope is dithered at a frequency substantially higher than the rate of rotation.

11. A inertial system comprising: a plurality of gyroscopes each of which provides signal corresponding to rate of rotation about its input axis, means for periodically dithering each of the gyroscopes about an axis perpendicular to its input axis, means for delaying the signal from each of the gyroscopes to provide a delayed signal which lags the gyroscope signal by one-half of the dithering period, and means for combining the delayed signals with the signals from the corresponding gyroscopes to provide output signals from which bias has been cancelled.

12. The system of claim 11 wherein the input axes of the gyroscopes are perpendicular to each other.

13. The system of claim 11 wherein the input axes of the gyroscopes lie in a common plane.

14. The system of claim 11 wherein the means for combining the delayed signals with the signals from the gyroscopes includes means for subtracting one of the signals from the other.

15. The system of claim 11 wherein the means for combining the signals comprises means for inverting the gyroscope signals and means for adding the delayed signals and the inverted signals together to provide the output signals.

16. The system of claim 11 including means for demodulating the output signal.

17. The system of claim 11 wherein the means for periodically dithering the gyroscope includes means for dithering each of the gyroscopes at a frequency substantially higher than the rate of rotation about its input axis.

18. A method of cancelling the bias of a plurality of gyroscopes each of which provides signal corresponding to rate of rotation about its input axis, comprising the steps of: periodically dithering each of the gyroscopes about an axis perpendicular to its input axis, delaying the signal from each of the gyroscopes to provide a delayed signal which lags the gyroscope signal by one-half of the dithering period, and combining the delayed signals with the signals from the corresponding gyroscopes to provide output signals from which the bias has been cancelled.

19. The system of claim 18 wherein the input axes of the gyroscopes are perpendicular to each other.

20. The system of claim 18 wherein the input axes of the gyroscopes lie in a common plane.

21. The method of claim 18 wherein the delayed signals are combined with the signals from the corresponding gyroscopes by subtracting one of the signals from the other.

22. The method of claim 18 wherein the signals are combined by inverting the gyroscope signals and adding the delayed signals and the inverted signals together to provide the output signals.

23. The method of claim 18 including the step of demodulating the output signals.

24. The method of claim 18 wherein each of the gyroscopes is dithered at a frequency substantially higher than the rate of rotation.

\* \* \* \* \*